United States Patent
Carazo et al.

(10) Patent No.: US 11,030,970 B2
(45) Date of Patent: Jun. 8, 2021

(54) METHOD AND DEVICE FOR DISPLAYING A NOTIFICATION FOR A USER AND WORKING DEVICE

(71) Applicant: Bayerische Motoren Werke Aktiengesellschaft, Munich (DE)

(72) Inventors: Miriam Carazo, Munich (DE); Christoph Mueller-Albrecht, Starnberg (DE); Bernd Stilling, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/506,837

(22) Filed: Jul. 9, 2019

(65) Prior Publication Data

US 2019/0333471 A1 Oct. 31, 2019

Related U.S. Application Data

(63) Continuation of application No. PCT/EP2017/079097, filed on Nov. 14, 2017.

(30) Foreign Application Priority Data

Jan. 20, 2017 (DE) ..................... 10 2017 200 915.2

(51) Int. Cl.
*G09G 5/00* (2006.01)
*B60K 35/00* (2006.01)
(Continued)

(52) U.S. Cl.
CPC ............ *G09G 5/006* (2013.01); *B60K 35/00* (2013.01); *G07C 5/0825* (2013.01); *G09G 5/37* (2013.01);
(Continued)

(58) Field of Classification Search
CPC ..................................................... G09G 5/006
(Continued)

(56) References Cited

U.S. PATENT DOCUMENTS 10,235,117 B2 3/2019 Hoshihara et al.
2012/0036418 A1* 2/2012 Morino ................... G09G 5/14
714/807
(Continued)

FOREIGN PATENT DOCUMENTS

DE 10 2011 054 823 A1 5/2012
DE 10 2013 012 679 A1 2/2015
(Continued)

OTHER PUBLICATIONS

PCT/EP2017/079097, International Search Report dated Feb. 26, 2018 (Two (2) pages).
(Continued)

*Primary Examiner* — Shivang I Patel
(74) *Attorney, Agent, or Firm* — Crowell & Moring LLP (57) ABSTRACT

The invention relates to a method for displaying a notification for a user in which first image data associated with the notification is displayed on a display unit in a normal display mode. The method also includes displaying second image data associated with the notification on the display unit in a safety display mode as soon as a predetermined fault condition is satisfied in the normal display mode. The predetermined fault condition being satisfied is checked by comparing a current display of the first image data by the display unit in the normal display mode, with respect to a presence of image faults, with a reference display of the first image data by the display unit in the normal display mode. The current display and the reference display are subdivided into regions and/or pixels for the comparison, said regions and/or pixels being associated with classes as background, fore-
(Continued)

ground, image edge and/or irrelevant. Color value intervals and/or color value thresholds are set for each class based on an RGB scheme. A position within or outside of the color value intervals and/or color thresholds is established for each region and/or for each pixel and for each class, and an image fault is identified in response to a position being established outside of the color value intervals and/or color value thresholds, where regions and/or pixels that are classified as irrelevant are excluded from said comparing.

16 Claims, 4 Drawing Sheets

(51) Int. Cl.
  *G07C 5/08* (2006.01)
  *G09G 5/37* (2006.01)
(52) U.S. Cl.
  CPC .... *B60K 2370/172* (2019.05); *B60K 2370/18* (2019.05); *B60K 2370/52* (2019.05); *G09G 2354/00* (2013.01)
(58) Field of Classification Search
  USPC .......................................................... 345/520
  See application file for complete search history.

(56) References Cited

U.S. PATENT DOCUMENTS

| 2012/0127145 A1 | 5/2012 | Jang et al. |
| 2016/0027406 A1* | 1/2016 | Fiedler ................... G09G 5/14 345/501 |

FOREIGN PATENT DOCUMENTS

| DE | 11 2013 006 557 T5 | 10/2015 |
| DE | 10 2016 200 826 A1 | 7/2017 |
| EP | 2 779 151 A1 | 9/2014 |
| JP | 2012-189762 A | 10/2012 |
| KR | 10-2010-0111536 A | 10/2010 |

OTHER PUBLICATIONS

German Search Report issued in German counterpart application No. 10 2017 200 915.2 dated Aug. 11, 2017, with Statement of Relevancy (Eleven (11) pages).
ISO 26262-1, "Road vehicles—Functional safety—Part 1: Vocabulary", Nov. 15, 2011, 32 total pages.

* cited by examiner

METHOD AND DEVICE FOR DISPLAYING A NOTIFICATION FOR A USER AND WORKING DEVICE

CROSS REFERENCE TO RELATED APPLICATIONS

This application is a continuation of PCT International Application No. PCT/EP2017/079097, filed Nov. 14, 2017, which claims priority under 35 U.S.C. § 119 from German Patent Application No. 10 2017 200 915.2, filed Jan. 20, 2017, the entire disclosures of which are herein expressly incorporated by reference.

BACKGROUND AND SUMMARY OF THE INVENTION

The present invention relates to a method and an apparatus for displaying a notification for a user and a working apparatus. In particular, the present invention relates to the reliable display of safety-relevant content in conjunction with complex IT apparatuses, and a vehicle.

Safety requirements in the automotive industry, but also in conjunction with other working apparatuses, are becoming ever more important. In order to ensure the greatest possible safety for various products, various standards (e.g., ISO 26262) have been introduced for electrical or electronic systems in motor vehicles, for example. Malfunctions of electrical or electronic components in a motor vehicle should be minimized by observing these standards.

The classification according to the ASIL (automotive safety integrity level) concept was introduced for distinguishing safety-relevant aspects. This classification is implemented in grades from A to D, with ASIL D placing the most stringent demands on the securing of systems.

By way of example, danger notifications, which are output to a driver as a user by way of an instrument cluster and/or any other display within a vehicle belong to a group of safety-relevant systems or messages. These messages are also referred to as check control messages (CCM) and contain text and/or a symbol, for example.

In conjunction with increasing safety requirements, the onus is to ensure that at least the safety-relevant messages are displayed reliably and without fault within the time interval specified to this end.

The invention is based on the object of developing an apparatus and a method for displaying a notification for a user and a working apparatus connected therewith, in which a particularly high degree of reliability is achieved by simple means when displaying safety-relevant notifications.

According to a first aspect of the present invention, a method for displaying a notification for a user is developed, wherein
(i) first image data associated with the notification are displayed on a display unit in a first or normal display mode,
(ii) second image data associated with the notification are displayed on a display unit, in particular on the same display unit, in a second or safety display mode as soon as a predetermined fault condition is satisfied in the normal display mode, and
(iii) the predetermined fault condition being satisfied is checked by virtue of a current display of the first image data by the display unit in the normal display mode being compared, in respect of the presence of image faults, with a reference display of the first image data by the display unit in the normal display mode.

Further, according to the invention, the current display and the reference display are subdivided into regions and/or pixels for comparison purposes, said regions and/or pixels being associated with classes as background, foreground, image edge and/or irrelevant. Color value intervals and/or color value thresholds are set for each class, in particular on the basis of an RGB scheme. A position within or outside of the color value intervals and/or color thresholds is established for each region and/or for each pixel and for each class. An image fault is identified in the case of a position outside of the color value intervals and/or color value thresholds.

Thus, one aspect of the present invention consists in detecting a presence or a lack of presence of a certain fault condition in conjunction with the display and in a necessary change of the display mode guided thereby. As a result of these measures, there can be an immediate reaction when a display fault occurs, and the display mode can be changed so that safety-relevant aspects can continue to be displayed to the user as a notification.

A further aspect of the invention lies in the fault-tolerant image comparison, which harbors an advantage over known image checks by means of check sums. Changing from a normal display mode to a safety display mode in the case of fault is essential as a fault reaction.

In principle, there are various options of comparing a current display and a reference display. A particularly high degree of reliability emerges when the comparison with the reference display is implemented by virtue of the current content of an image memory of the display unit in respect of the current display being read and compared with the content of the image memory of the display unit in respect of the reference display.

Additionally, different analysis parameters lend themselves to examining the current display and the reference display.

Regions and/or pixels that are classified as irrelevant can be excluded from the above-described comparison.

In principle, various scenarios can lead to the presence of a fault condition being identified.

In a particularly preferred configuration of the method according to the invention, the predetermined fault condition is satisfied if the number of image faults of the current display exceeds a predetermined threshold in comparison with the respective reference display.

In particular, this can be related to a predetermined minimum time interval. This means that the presence of a fault is only identified once the fault condition persists for at least a minimum time interval and, in particular, is present therebeyond.

In an advantageous development, the threshold and/or the minimum time interval can be set dynamically and/or depending on the notification and/or the context thereof, the first image data, a display position and/or the display unit. Any other dependencies may also be provided for the purposes of setting the threshold and/or the minimum time interval.

It is conceivable to realize the various display modes in conjunction with display regions that are separated from one another or even in conjunction with separated display devices.

Particularly simple conditions set in, also in view of the viewing habits of the user, if, on the basis of another advantageous development of the method according to the invention, a change between the normal display mode and the safety display mode is implemented by an overlay, in certain regions or everywhere, of the displays of the first and the second image data, in particular on a normal display layer or normal display interface or safety display layer or safety display interface and/or in the style of a combined display, for example by overlaying and/or blitting.

The reliability of the method according to the invention for displaying a notification can be increased further by virtue of the first image data for the normal display mode having greater graphics and/or image complexity than the second image data for the safety display mode, in particular in respect of the color values and/or the breadth of the respective value ranges of the color values.

In another development of the method according to the invention, provision is made for the normal display mode to be realized in conjunction with a normal graphics interface and for the safety display mode to be realized by way of a safety interface, wherein reference displays are generated and/or stored in, or in conjunction with, the safety interface.

As an alternative or in addition thereto, provision can be made for the size and/or position of one or more display regions of a display to be set by, or in conjunction with, the normal display mode and, in particular, by, or in conjunction with, the normal graphics interface.

Different options of application lend themselves to the method according to the invention. However, the procedure according to the invention is of particular importance in conjunction with notifications which, as notifications, display safety-relevant information items in relation to the operation of an underlying working apparatus and, in particular, a vehicle and, in particular, in conjunction with an operating or driving mode, a normal function and/or a malfunction of the component and/or an operating or driving parameter.

An apparatus for displaying a notification is developed according to a further aspect of the present invention. The apparatus according to the invention comprises a display unit that is embodied for the controlled display of the notification or of first and/or second image data associated therewith. Moreover, a control device is embodied to control the display of the, or by the, display unit on the basis of the method according to the invention for displaying a notification.

Furthermore, the present invention develops a working apparatus and, in particular, a vehicle. The working device is equipped with the apparatus according to the invention for displaying a notification.

Further details, features and advantages of the invention emerge from the following description and the figures.

Other objects, advantages and novel features of the present invention will become apparent from the following detailed description of one or more preferred embodiments when considered in conjunction with the accompanying drawings.

DETAILED DESCRIPTION OF THE DRAWINGS

Exemplary embodiments and the technical background of the invention are described in detail below with reference to FIGS. 1 to 4. The same and equivalent elements and components, and elements and components with the same or equivalent effect, are denoted by the same reference sign. The detailed description of the denoted elements and components are not reproduced at every case of their occurrence.

The illustrated features and further properties can be isolated from one another in any form and can be combined with one another in any combination without departing from the core of the invention.

Figure 1:
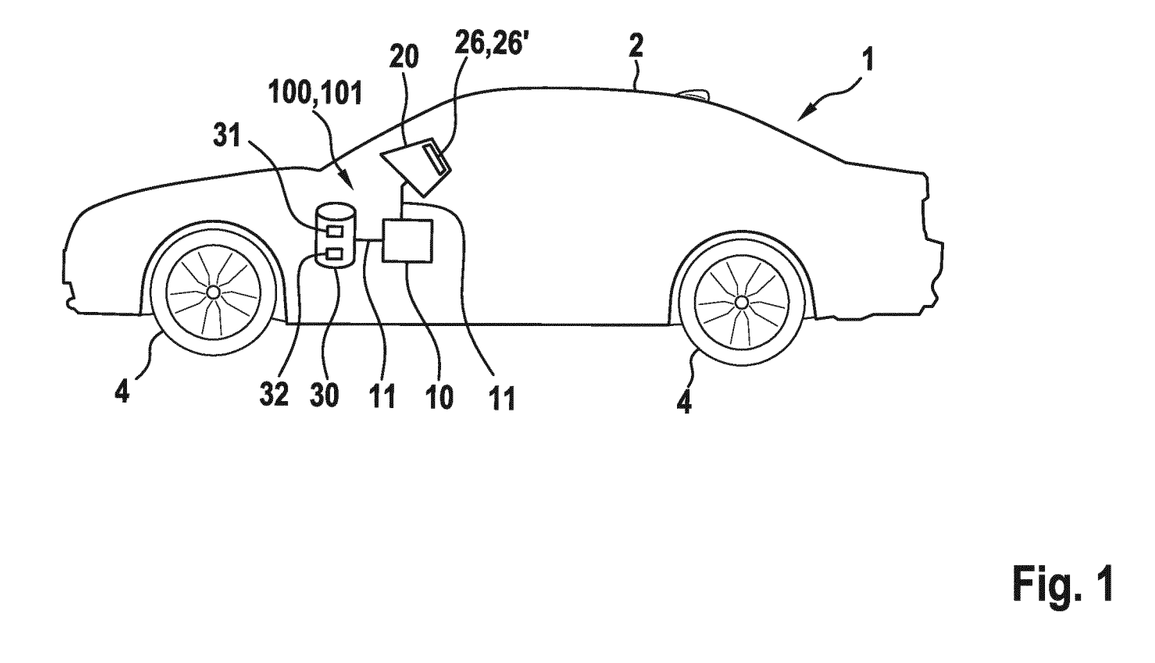
FIG. 1 shows a schematic side view of an exemplary embodiment of a vehicle according to the invention as a working apparatus with an exemplary embodiment of an apparatus according to the invention for displaying a notification.

FIG. 1 shows a schematic side view of an exemplary embodiment of a vehicle 1 according to the invention as a working apparatus with an exemplary embodiment of an apparatus according to the invention for displaying a notification.

The vehicle 1 according to the invention is configured as an automobile in FIG. 1 and it comprises a body 2 and wheels 4 that are drivable by way of a drive that is not illustrated here. For the purposes of providing a user of the vehicle 1 with information in respect of safety-relevant information items, for example in respect of the state or the operation of the vehicle 1, the vehicle 1 according to the invention comprises an embodiment of the apparatus 100 according to the invention for displaying a notification, which can also be considered to be an interface 101 and, in particular, a user interface and which has hardware and/or software components in accordance therewith.

The apparatus 100 as a user interface 101 has a display unit 20 for displaying notifications and first and second image data 31 and 32 associated with the notifications, said display unit being linked via a control line 11 to a capture and control unit 10 and, indirectly, to a memory unit 30 via the latter. The memory unit 30 itself is configured to save the corresponding first and second image data 31 and 32 for different notifications, in particular notifications that are safety relevant, so as to transmit these via the control line 11 to the actual display unit 20 for display purposes 26, 26' by way of being called by means of the capture and control unit 10.

As already explained, first image data 31 take effect in a first or normal display mode and second image rates 32 take effect in a second or safety display mode for the purposes of displaying the safety-relevant notification on the display 26.

To this end, it is necessary to establish in view of an existing display 26 as to whether or not a fault condition leading a change from the normal display mode to the safety display mode is present.

To this end, image regions 50 of the display 26 and of the reference display 26' to be related therewith are analyzed in view of picture elements 51, which are also referred to as pixels, and subdivided into various classes, for example into classes 51-0 to 51-3 with the following meaning: 51-0—background, 51-1—foreground, 51-2—edge region and 51-3—irrelevant. This is illustrated schematically in FIG. 2.

Figure 2:
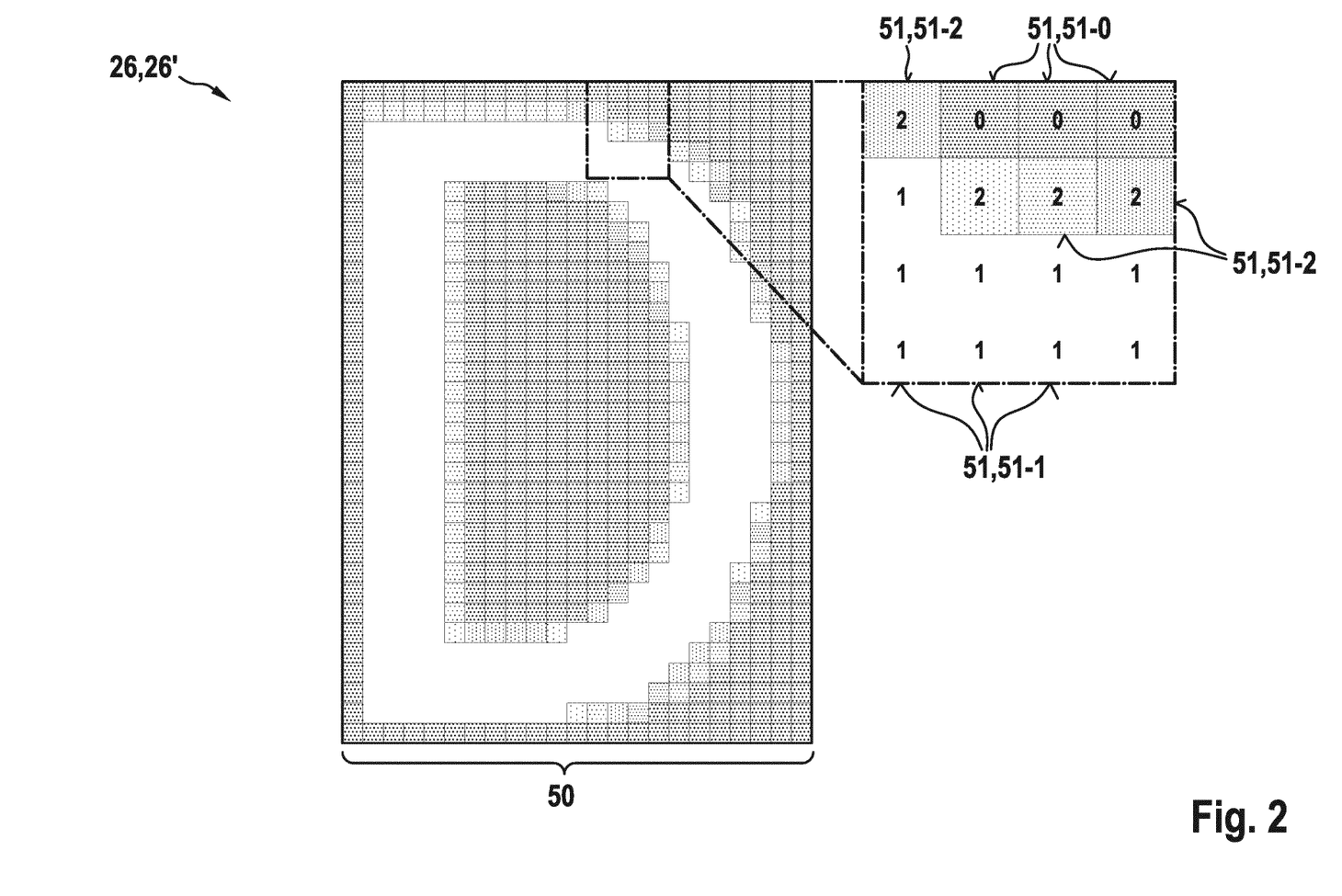
FIG. 2 explains, in a schematic illustration, options for characterizing an image region of a display in the style of an image matcher.

FIG. 2 explains options for characterizing an image region 50 of a display 26 or reference display 26', in particular in the style of an image matcher, which is also referred to as IM.

Here, corresponding image regions 50 for a current display 26 and for a reference display 26' are compared to one another picture-element-by-picture-element, in particular pixel-by-pixel. Deviations are counted as image faults if, for example, color values of the individual pixels lie outside of assigned color value ranges or thresholds.

Present picture element faults or pixel faults are summed in terms of their number, per image region 50 or for the entire display 26. If necessary, the sum is compared with a threshold, with the presence of a fault condition being identified if the threshold is exceeded.

Additionally, a temporal boundary condition can be configured such that the presence of a fault condition when the threshold is exceeded is only identified if the threshold exists for minimum time interval. This is also referred to as fault tolerance time or FTT. The FTT value can be chosen to have different lengths depending on the type of the safety-relevant notification, even dynamically where necessary; by way of example, it could be in the region of 0.5 seconds for a wrong gear indicator or one to 2 seconds for a CCM notification in relation to an open rear hatch.

The following querying scheme can come to bear in view of the color value ranges, with this being based on RGB colors:
Background class 51-0: $R<T_{BR}$, $G<T_{BG}$, $B<T_{BB}$
Foreground class 51-1: $R>T_{FR}$, $G>T_{FG}$, $B>T_{FB}$
Edge region class 51-2: $T_{AR-}<R<T_{AR+}$
$T_{AG-}<G<T_{AG+}$
$T_{AB-}<B<T_{AB+}$ Here, the corresponding thresholds or interval boundaries can be set depending on application.

Figure 3:
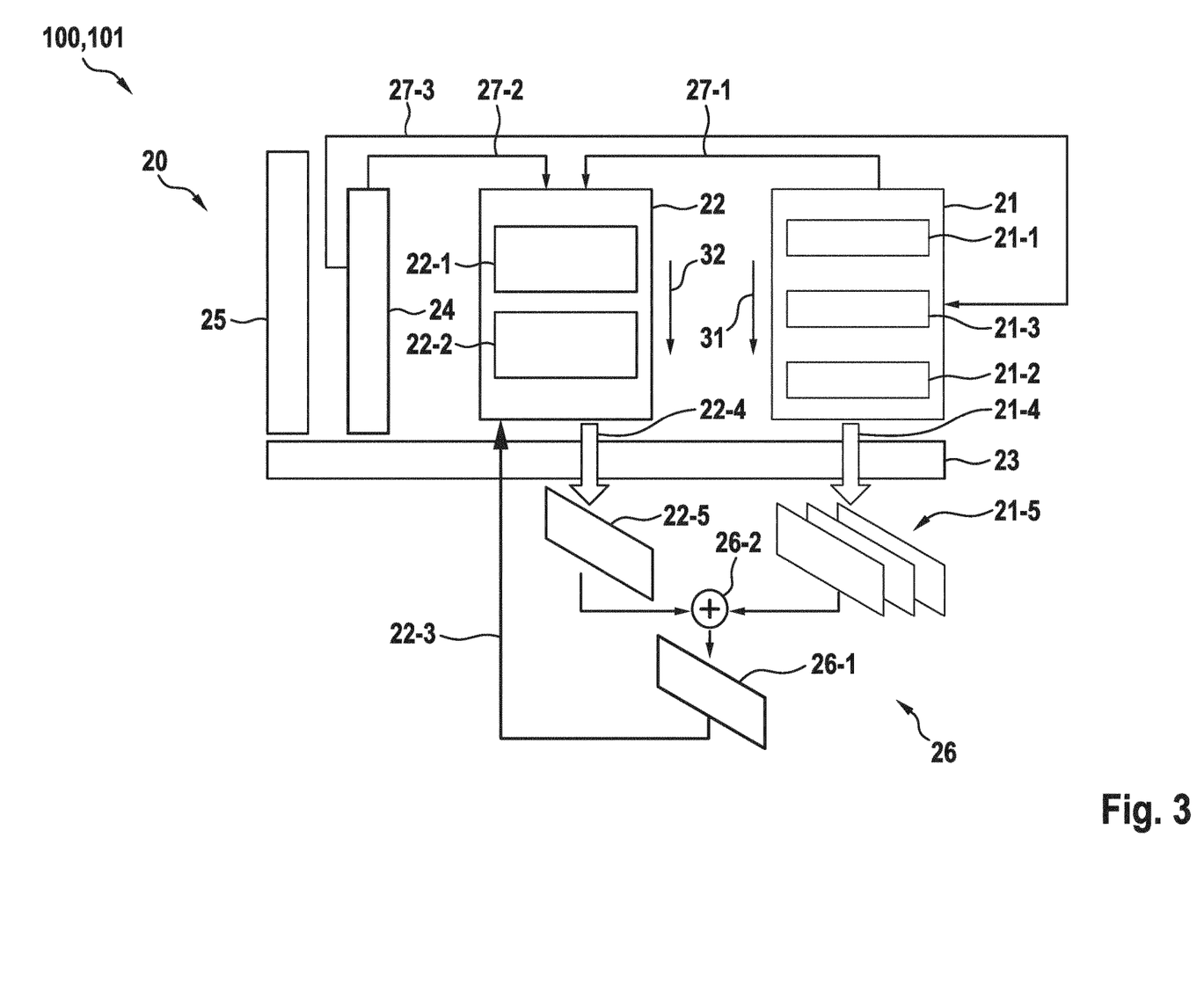
FIG. 3 shows, in the style of a block diagram, the design of a display unit according to the invention in conjunction with an apparatus according to the invention, specifically in the style of a user interface.

FIG. 3 shows, in the style of a block diagram, the design of a display unit 20 according to the invention in conjunction with an apparatus 100 according to the invention, specifically considered as a user interface 101.

For the purposes of realizing the normal display mode and the safety display mode, a normal interface unit 21-1 (HMI) as a human machine interface, a graphics processor 21-3 (graphics engine) and a corresponding normal graphics driver 21-2 are defined as normal and not ASIL compliant in conjunction with a first address space 21 and a second address space 22 (VAS), and a safety interface unit 22-1 (safety HMI) and a safety graphics driver 22-2 (safety graphics driver) are defined as ASIL compliant in conjunction with a second address space 22 (VAS).

By way of these address spaces 21 and 22, first and second image data 31 and 32, respectively, which are assigned to a notification to be displayed, are supplied by means of transfer processes 21-4 and 22-4 in controlled fashion via a graphics core 23 to a display 26 with a plurality of normal layers 21-5 (non-safety layer) and a safety layer 22-5 (safety layer). Here, a combined display 26-1 arises by way of an overlaying and/or blitting process 26-2, in which the presence or lack of presence of a corresponding fault condition is taken into account, as described in detail above.

FIG. 3 shows the process 22-3 of back reading (back read) of the display 26, either for defining the reference display 26' and/or for the comparison process.

The control processes 21-1 and 22-1 and the corresponding protected address spaces 21 and 22 are coupled for control purposes with further control components 24 (IPC (grey channel)) and 25 (operating system) by way of appropriate interfaces 27-1, 27-2, 27-3, wherein the interface 27-3 transmits all signals, the interface 27-2 by contrast transferring, e.g., the so-called warning lamp, gear indicator and warning message signals, which, in particular, are secured by check sums and alive counters. The interface 27-1 transmits position and/or size of the display 26 from the normal display unit 21-1 in conjunction with the first address space 21 to the safety display unit 22-1 in conjunction with the second address space 22, wherein the signals for warning lamps, the gear indicator and warning messages may likewise become important.

Figure 4:
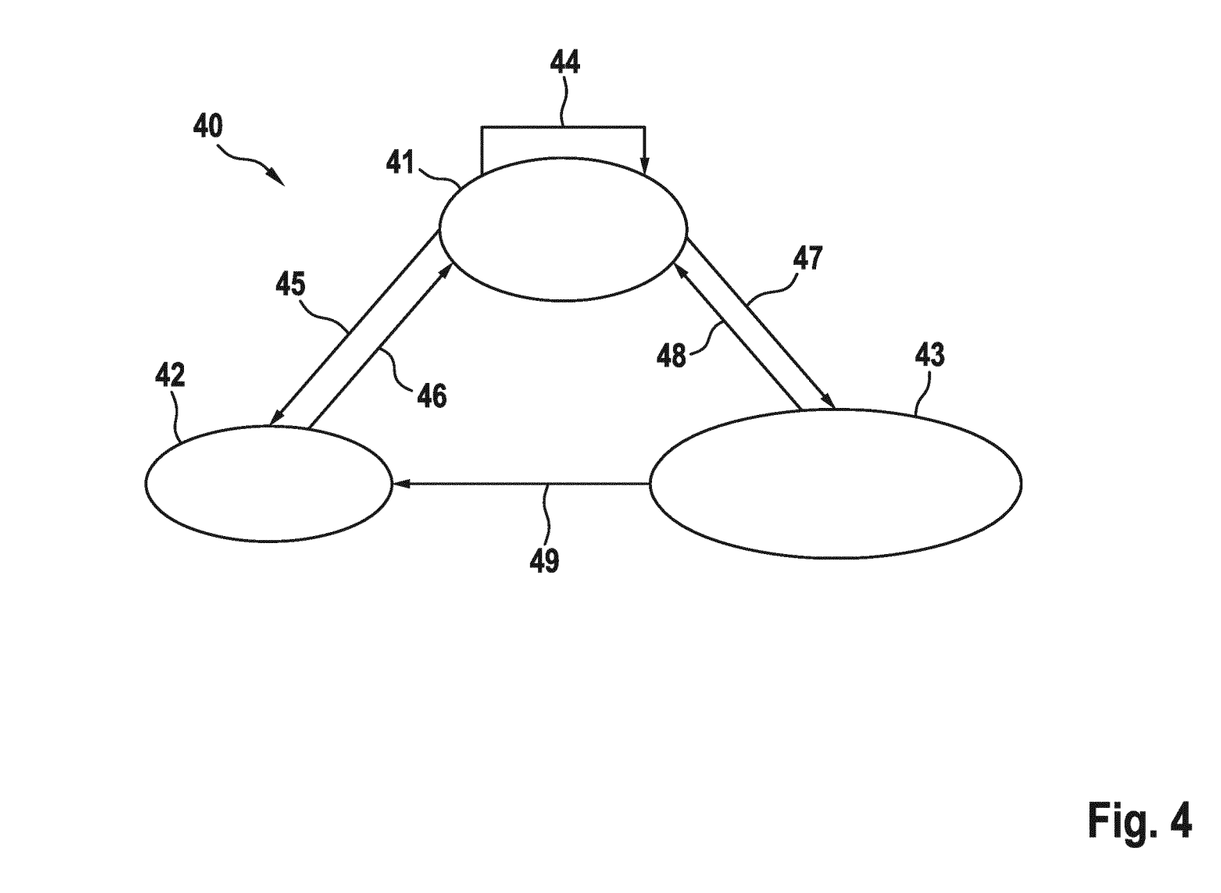
FIG. 4 explains, in the style of a block diagram, an embodiment of the method according to the invention in conjunction with a finite-state machine.

In the style of a block diagram, FIG. 4 explains an embodiment of the method according to the invention in conjunction with a finite-state machine 40 (state machine).

The state machine 40 according to FIG. 4 realizes the process operation for the alternative representation of the display 26 with the first image data 31 and the second image date 32 depending on the presence or lack of presence of a fault condition in the manner as described above.

The state machine 40 according to FIG. 4 comprises three states, specifically a first or normal state 41, a safety state 42 and a degraded state 43.

In the normal state 41, use is made of the normal interface unit 21-1 with monitoring by the safety interface unit 22-1. Here, the clock for the fault tolerance time FTT is reset as soon as the image correspondence check according to process 44, i.e., the image matcher, verifies the display 26. The first image data 31 are displayed 26 to the user in the normal state 44 for the notification.

The display 26 in the safety state 42 is implemented by the safety interface 21-1 using the second image data 32 for displaying the notification to the user.

According to the process 45, the transition from the normal state 41 to the safety state 42 is implemented in the presence of continuously faulty input signals over a period of time that is greater than the fault tolerance time FTT.

According to the process 46, the transition from the safety state 42 back to the normal state 41 is implemented in the presence of correct input signals.

The transition 47 to the degraded state 43 is implemented in the case of a continuous lack of correspondence during a time interval that is longer than the fault tolerance time FTT. A return 48 to the normal state 41 from said degraded state is possible under different conditions, including an image correspondence for a certain number of images or frames and/or if a signal change is present.

A transition 49 from the degraded state 43 to the safety state 42 is possible in the case of a continuous presence of faulty input signals during a time interval that is longer than the fault tolerance time FTT.

These and further features and properties of the present invention are explained in more detail on the basis of the following explanations:

The present invention builds on different safety display concepts, which serve as a basis for the invention present here and which relate, in particular, to the reliable display of safety-relevant notifications in complex IT appliances.

This idea is extended by the present invention, in particular in order to avoid the disadvantages, listed below, of the previous procedures:
  There is a very restricted design, determined in advance, for the display of contents.
  No animations of the display are possible.
  The current methods that are based on checking the display content by means of check sums demand an image that has been predetermined by up to 100%. All deviations, e.g., a different background, light effects or shadow effects, would be identified as faults. Consequently, the conventional procedure is inflexible and susceptible to errors.
  The current method displays a pre-rendered image. No animations, light/shadow effects, changes in the background or the like are possible and this results in a poor integration of the safety-relevant content in the overall scene, with great design restrictions overall.

Additionally, this results in a faulty or lacking display of information items and/or notifications in the case of faults in the display surface.

A basic idea of the present invention lies in permanently securing the correct display of safety-relevant notifications and information items within a scene, which is displayed by a human machine interface or HMI that was not developed pursuant to ASIL B and that allows a higher degree of flexibility of the display.

The introduction of a safety interface 22-1 that secures the representation or display 26, said safety interface also been referred to as safety HMI and being linked to the securing class ASIL B, is essential to this idea.

This safety HMI 22-1 continuously checks the display 26 of the safety-relevant notifications of a non-secured and hence normal interface 21-1, which is also referred to as non-safety layer or normal HMI, for deviations, specifically by virtue of the display image memory, which is also referred to as display frame buffer, of the normal display layer 21-5, which is also referred to as non-safety layer, i.e., the image memory of the current display 26 or the current representation on the display 26, being read—in particular by back read 22-3—and being compared to reference displays 26' or reference images.

The comparison device required to this end—for example, a so-called image matcher or IM 44—is an aspect of the present invention and in any case contains specific requirements for a reference image comparison.

In so doing, position and/or size of the safety-relevant display regions are predetermined by the normal interface 21-1 or HMI.

The reference displays 26' or reference images are stored in the safety HMI 22-1 and the individual pixels 51 or image components are subdivided to various regions or classes 51-0 to 51-3, in particular foreground 51-1, background 51-0, antialiasing regions 51-2 and into irrelevant or don't-care regions according to class 51-3.

There are predetermined image fault thresholds and, in particular, color thresholds for each of these groups or classes 51-0 to 51-3.

For each pixel 51, the image matcher IM, 44 checks whether the color of said pixel lies within a predetermined range, and so a certain deviation from the actual color scheme can be tolerated.

Furthermore, it is possible to set a certain threshold for the maximum tolerated number of faulty pixels, above which the safety interface 22-1 or safety HMI takes over the representation or display 26 of the safety-relevant information.

By way of example, the tolerated number of pixel faults can be set depending on the image size.

Provided that the display 26 of the information items on the normal HMI layer 21-5, e.g., in conjunction with a second virtual address space VAS 1, remains fault free or almost fault free and hence provided that the pixel fault number lies below the threshold, the display 26 by, or of, the safety interface 22-1 or safety HMI remains concealed and the display 26 is implemented by way of the normal interface 21-1 or non-safety HMI.

Once the threshold is exceeded, the safety interface 22-1 or safety HMI takes over the representation or display 26 of the safety-relevant information item in the faulty region, in particular on the safety layer 22-5.

Here, a bitmap from the safety interface 22-1 or safety HMI is blitted onto the uppermost display graphics layer or safety layer 22-5 by way of a process 26-2 and hence the faulty content of the normal interface 21-1 or of the normal HMI layer 21-5 is overlaid such that the information is displayed correctly again.

The readout 22-3 of the representation by the display 26, i.e., the so-called back read for pixel comparison, is implemented continuously and at a fixed time interval. Consequently, it is possible to fade animations into the normal HMI layer 21-5, provided that the duration of this animation is shorter than the fault tolerance time of the back read, which is also referred to as FTT.

Even though the representation of the normal HMI layer 21-5 does not correspond to the reference display 26' or the reference image during the animation, the safety layer 22-5 is not activated immediately as the fault tolerance time or FTT has not yet been exceeded.

By way of example, this can be applied when representing the current gear:

In the normal case, an animation—e.g., rolling—can be shown when shifting up or down a gear. During the animation, there are image comparison faults; however, these do not lead to reaction by the safety HMI 22-1 as the animation is completed before the FTT expires and hence a valid, fault-free image is present.

However, should an incorrect gear now be displayed—e.g., a permanent display of a reverse gear in the case of the vehicle 1 in forward operation—it is determined after the FTT expires that the representation no longer corresponds to the reference display 26' or to the reference image from the safety layer 22-5. Thereupon, the safety HMI 22-1 takes over the representation or display 26 of the gear. The option of the animated display then no longer applies.

By way of example, the safety layer 22-5 and the reference images thereof may comprise fewer color values than the normal HMI display and correspondingly consume comparatively less memory capacity. Although this results in a less appealing representation or display 26 of the information, this is only intended for display in an emergency and should not represent a permanent state.

By way of example, a reference image has two bits per pixel, the color and the thresholds are stored per bitmap.

The data compression can be implemented by run length encoding (RLE).

All antialiasing pixels—i.e., pixel 51 of the class 51-2—can have the same, in particular "mean" color, which is defined by the prescription: (foreground color+background color)/2.

The operating states or operating modes of the safety interface or safety HMI 22-1 (Gen2) consist of, e.g., individual finite-state machines 40, specifically for each vehicle function to be displayed, e.g., check control symbol, telltales (monitoring lamps), GearSpa etc., with states 41, 42, 43 as indicated in conjunction with FIG. 4.

That is to say, for each vehicle function, there is a normal representation in the normal HMI 21-1 and a specific reference image 26', which is only activated in the case of a fault of the relevant vehicle function; if the latter is activated, the other, fault-free functions continue to be represented by the normal HMI 21-1.

Inter alia, the following advantages can be achieved by the present invention:

Safety-relevant content can be represented in animated form.

Safety-relevant content can be stored with or presented on different background representations.

The safety relevant content need not necessarily have a rectangular frame.

Reference images are substantially smaller than full-color bitmaps; a lower storage space consumption sets in.
The image comparison tolerates certain deviations in the color scheme and pixel errors.
Reference images are only displayed in the case of a fault.

LIST OF REFERENCE SIGNS

1 Vehicle, working apparatus
2 Body
4 Wheel
10 Capture and control unit
11 Control line
20 Display unit
21 (First) address space VAS 1, non-compliant with ASIL B
21-1 Normal interface unit
21-2 Normal graphics driver
21-3 Graphics processor
21-4 Data transfer
21-5 Display layer (non-safety layer)
22 (Second) address space VAS 2—compliant with ASIL B
22-1 Safety interface unit
22-2 Safety graphics driver
22-3 Back read process
22-4 Data transfer
22-5 Safety layer
23 Graphics core
24 Process/unit as per IPC (gray channel)
25 Process/unit as per integrity OS (ASIL B)
26 Display
26' Reference display
26-1 Combined display
26-2 Blitting and/or blending
27-1 Link, control line
27-2 Link, control line
27-3 Link, control line
30 Memory unit
31 (First) image data
32 (Second) image data
40 Finite-state machine
41 Normal state
42 Safety state
43 Degraded state
44 Image correspondence check
45-49 Transition
50 Image region
51 Pixel, picture element
51-0 Background class
51-1 Foreground class
51-2 Edge region class
51-3 Irrelevant class
100 Display apparatus
101 Interface The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for displaying a notification for a user, the method comprises the acts of:
    displaying first image data of the notification on a display unit in a normal display mode;
    displaying second image data of the notification on the display unit in a safety display mode in response to a predetermined fault condition being satisfied in the normal display mode; and
    checking whether the predetermined fault condition is satisfied by comparing a current display of the first image data by the display unit in the normal display mode with a reference display of the first image data by the display unit in the normal display mode, so as to determine the presence of image faults, wherein the comparing includes:
        subdividing the current display and the reference display into regions and/or pixels,
        associating each of the regions and/or pixels with one of the following classes: background, foreground, image edge and irrelevant,
        setting color value intervals and/or color value thresholds for each class, except for irrelevant, based on an RGB scheme,
        establishing, for each region and/or pixel of each class, except for irrelevant, a position within or outside of the color value intervals and/or color thresholds, and
        identifying the presence of image faults, wherein an image fault is identified for a region and/or pixel when the position of the region and/or pixel is outside of the color value intervals and/or color value thresholds.

2. The method as claimed in claim 1, wherein said comparing to the reference display is implemented by virtue of current content of an image memory of the display unit in respect of the current display being read and compared to the content of the image memory of the display unit in respect of the reference display.

3. The method as claimed in claim 2,
    wherein the predetermined fault condition is satisfied if a number of image faults of the current display exceeds a predetermined threshold in comparison with the respective reference display for a predetermined minimum time interval,
    wherein the threshold and/or the predetermined minimum time interval are set dynamically and/or depending on a notification and/or a context thereof, the first image data, a display position and/or the display unit.

4. The method as claimed in claim 3, wherein the normal display mode is realized in conjunction with a normal graphics interface and the safety display mode is realized by way of a safety interface, wherein reference displays are generated and/or stored in, or in conjunction with, the safety interface.

5. The method as claimed in claim 2, wherein a change between the normal display mode and the safety display mode is implemented by an overlay of the displays of the first and the second image data on a normal display layer, a normal display interface, safety display layer, a safety display interface and/or in the style of a combined display.

6. The method as claimed in claim 2, wherein the normal display mode is realized in conjunction with a normal graphics interface and the safety display mode is realized by way of a safety interface, wherein reference displays are generated and/or stored in, or in conjunction with, the safety interface.

7. The method as claimed in claim 1,
    wherein the predetermined fault condition is satisfied if a number of image faults of the current display exceeds a predetermined threshold in comparison with the respective reference display for a predetermined minimum time interval, wherein the threshold and/or the predetermined minimum time interval are set dynamically and/or depending on a notification and/or a context thereof, the first image data, a display position and/or the display unit.

8. The method as claimed in claim 7, wherein a change between the normal display mode and the safety display mode is implemented by an overlay of the displays of the first and the second image data on a normal display layer, a normal display interface, safety display layer, a safety display interface and/or in the style of a combined display.

9. The method as claimed in claim 7, wherein the normal display mode is realized in conjunction with a normal graphics interface and the safety display mode is realized by way of a safety interface, wherein reference displays are generated and/or stored in, or in conjunction with, the safety interface.

10. The method as claimed in claim 1, wherein a change between the normal display mode and the safety display mode is implemented by an overlay of the displays of the first and the second image data on a normal display layer, a normal display interface, safety display layer, a safety display interface and/or in the style of a combined display.

11. The method as claimed in claim 1, wherein the first image data for the normal display mode have greater graphics and/or image complexity than the second image data for the safety display mode with respect to color value and/or breadth of respective value ranges of color values.

12. The method as claimed in claim 1, wherein the normal display mode is realized in conjunction with a normal graphics interface and the safety display mode is realized by way of a safety interface, wherein reference displays are generated and/or stored in, or in conjunction with, the safety interface.

13. The method as claimed in claim 1, wherein the size and/or position of one or more display regions of a display are set by, or in conjunction with, the normal display mode and by, or in conjunction with, the normal graphics interface.

14. The method as claimed in claim 1, wherein safety-relevant information items in relation to operation of a vehicle are displayed as notification in conjunction with an operating or driving mode, a normal function and/or a malfunction of a component and/or an operating or driving parameter.

15. An apparatus for displaying a notification, comprising:
a display unit configured to display the notification; and
a control device configured to:
display first image data of the notification on a display unit in a normal display mode;
display second image data of the notification on the display unit in a safety display mode in response to a predetermined fault condition being satisfied in the normal display mode; and
check whether the predetermined fault condition is satisfied by comparing a current display of the first image data by the display unit in the normal display mode with a reference display of the first image data by the display unit in the normal display mode, so as to determine the presence of image faults, wherein the comparing includes:
subdividing the current display and the reference display into regions and/or pixels,
associating each of the regions and/or pixels with one of the following classes: background, foreground, image edge and irrelevant,
setting color value intervals and/or color value thresholds for each class, except for irrelevant, based on an RGB scheme,
establishing, for each region and/or pixel of each class, except for irrelevant, a position within or outside of the color value intervals and/or color thresholds, and
identifying the presence of image faults, wherein an image fault is identified for a region and/or pixel when the position of the region and/or pixel is outside of the color value intervals and/or color value thresholds.

16. A vehicle comprising:
an apparatus for displaying a notification, the apparatus comprising:
a display unit configured to display the notification; and
a control device configured to:
display first image data of the notification on a display unit in a normal display mode;
display second image data of the notification on the display unit in a safety display mode in response to a predetermined fault condition being satisfied in the normal display mode; and
check whether the predetermined fault condition is satisfied by comparing a current display of the first image data by the display unit in the normal display mode with a reference display of the first image data by the display unit in the normal display mode, so as to determine the presence of image faults, wherein the comparing includes;
subdividing the current display and the reference display into regions and/or pixels;
associating each of the regions and/or pixels with one of the following classes: background, foreground, image edge and irrelevant;
setting color value intervals and/or color value thresholds for each class, except for irrelevant, based on an RGB scheme;
establishing, for each region and/or pixel of each class, except for irrelevant, a position within or outside of the color value intervals and/or color thresholds; and
identifying the presence of image faults, wherein an image fault is identified for a region and/or pixel when the position of the region and/or pixel is outside of the color value intervals and/or color value thresholds.

* * * * *